(12) United States Patent
Taibi et al.

(10) Patent No.: US 10,419,507 B2
(45) Date of Patent: Sep. 17, 2019

(54) METHOD AND DEVICE FOR RESERVING BANDWIDTH FOR AN ADAPTIVE STREAMING CLIENT

(71) Applicant: THOMSON LICENSING, Issy les Moulineaux (FR)

(72) Inventors: Charline Taibi, Chartres de Bretagne (FR); Francoise Le Bolzer, Rennes (FR); Remi Houdaille, Cesson Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 556 days.

(21) Appl. No.: 15/033,090

(22) PCT Filed: Oct. 2, 2014

(86) PCT No.: PCT/EP2014/071137
§ 371 (c)(1),
(2) Date: Apr. 28, 2016

(87) PCT Pub. No.: WO2015/062808
PCT Pub. Date: May 7, 2015

(65) Prior Publication Data
US 2016/0261661 A1    Sep. 8, 2016

(30) Foreign Application Priority Data

Oct. 29, 2013  (EP) .................................... 13306478
Jan. 6, 2014   (EP) .................................... 14305008

(51) Int. Cl.
*H04L 29/06*   (2006.01)
*H04L 12/26*   (2006.01)
(Continued)

(52) U.S. Cl.
CPC ...... *H04L 65/4092* (2013.01); *H04L 43/0882* (2013.01); *H04L 47/522* (2013.01);
(Continued)

(58) Field of Classification Search
CPC ............. H04L 65/4092; H04L 43/0882; H04L 47/522; H04L 47/72; H04L 65/4084; H04L 65/605; H04L 65/80; H04L 67/02
See application file for complete search history.

(56) References Cited

U.S. PATENT DOCUMENTS

2003/0161302 A1*  8/2003  Zimmermann ......... H04L 47/13
                                                    370/363
2008/0227484 A1*  9/2008  Auvray ................. H04L 67/303
                                                    455/552.1
(Continued)

FOREIGN PATENT DOCUMENTS

EP         2573997        3/2013

OTHER PUBLICATIONS

Kofler et al., "Improving IPTV services by H.264/SVC adaptation and traffic control", IEEE International Symposium on Broadband Multimedia Systems and Broadcasting, Bilbao, Portugal, May 13, 2009, pp. 1-6.

Primary Examiner — Wing F Chan
Assistant Examiner — Billy H Ng
(74) Attorney, Agent, or Firm — Meagher Emanuel Laks Goldberg & Liao, LLP

(57) ABSTRACT

The invention concerns a device for reserving bandwidth for an adaptive streaming client belonging to at least one network and configured for receiving a streaming content from at least one server, the streaming content being available at more than one data rate at the server. The device includes a stream identifier configured for detecting at least one streaming content requested by the client, a bandwidth (Continued)

manager configured for temporarily reserving for the client, when at least one event occurs, a transient bandwidth depending on the predetermined target data rate associated with the requested streaming content and a transient margin.

13 Claims, 3 Drawing Sheets

(51) Int. Cl.
  *H04L 12/873* (2013.01)
  *H04L 12/911* (2013.01)
  *H04L 29/08* (2006.01)

(52) U.S. Cl.
  CPC .......... *H04L 47/72* (2013.01); *H04L 65/4084* (2013.01); *H04L 65/605* (2013.01); *H04L 65/80* (2013.01); *H04L 67/02* (2013.01)

(56) References Cited

U.S. PATENT DOCUMENTS

| | | | | |
|---|---|---|---|---|
| 2010/0094956 A1* | 4/2010 | Zuckerman | ......... | H04L 67/1097 709/219 |
| 2010/0274919 A1* | 10/2010 | Greene | ............... | H04L 12/2801 709/231 |
| 2012/0213295 A1* | 8/2012 | Quere | ................ | H04N 21/4331 375/240.25 |
| 2014/0029629 A1* | 1/2014 | Polk | ...................... | H04L 47/724 370/468 |

* cited by examiner

METHOD AND DEVICE FOR RESERVING BANDWIDTH FOR AN ADAPTIVE STREAMING CLIENT

This application claims the benefit, under 35 U.S.C. § 365 of International Application PCT/EP14/071137, filed Oct. 2, 2014, which was published in accordance with PCT Article 21(2) on May 7, 2015 in English and which claims the benefit of European patent application 13306478.2, filed Oct. 29, 2013, and of European patent application 14305008.6 filed Jan. 6, 2014.

FIELD OF THE INVENTION

The present invention relates generally to video streaming content distribution and, in particular, to a method for controlling the bandwidth used by a video streaming content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

HTTP adaptive technologies are pushed by various stakeholders to allow provision of over the top audiovisual delivery in the Internet. Such technologies allow a client terminal to receive video in the form of small successive segments (a few seconds long), so called chunk. Each segment is requested through the HTTP protocol and may exist in different variants (so called representations), allowing the client terminal to choose at any time an appropriate bit rate matching the network and device constraints.

Among the HTTP adaptive streaming (HAS) protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developed by 3GPP within the SA4 group. These HTTP adaptive streaming existing techniques vary in the manifest file format, said manifest providing meta-data to describe the content options (bit rate, image dimensions, frame rate . . . ), the organization of the available representations of the content in segments, in the codecs supported, and in the content protection technologies.

In particular, when a client terminal wants to play an audio/video content, it first has to get such a manifest describing how this specific content can be obtained. This is done through HTTP by getting some 'file' from an URL. This manifest file lists the available representations of the content (in terms of bit rate and other properties) and, for each representation, the URLs that allow loading the content chunks for each time slice. For Video on Demand (VoD), the entire description of the A/V content is provided, while for live content (e.g. TV content), the description covers only a short period of time and needs to be reloaded periodically to discover the new items when time passes.

Depending on its capabilities and the knowledge it has from the networking environment, the client terminal selects one representation (e.g. based on its bit rate) and loads the first chunk(s) of content. It buffers a few chunks to be able to cope with network impediments. Then, the A/V content is played from each received chunks one after the other. At the same time, the client terminal measures the reception rate and may decide to select a higher or a lower bit rate. In such case, it just requests the next chunk(s) from another representation. Every HTTP streaming technique is such that it is possible for the client terminal to keep a continuous playing while going from a chunk with a given bit rate to the next chunk with another bit rate. This way when the competing traffic on the network introduces variations on the rate at which the A/V content is received, the client terminal is able to react and adapt by selecting chunks with a bit rate that allows maintaining the buffer filling to a secure level. Indeed, the client terminal tries to reach the highest possible bit rate to provide a good viewing quality to end user, while staying at a level where the rendering will not suffer from late reception of data causing macro-blocks or picture freezes.

More particularly, a HAS player is usually made available from a service provider application and can be downloaded by the user. An adaptive streaming player involves the three following key functions:

the chunk request scheduling. Two request strategies are generally implemented. The immediate download used during the initial ramp-up phase to build up the player buffer and the periodic download used in the steady phase to maintain a constant playback buffer. Depending on the players' initial conditions, the periodic download can lead to suboptimal time allocation resulting in unfairness in bandwidth allocation when a HAS stream compete for bandwidth with another stream, as described in "Improving Fairness, Efficiency, and Stability in HTTP-based Adaptive Video Streaming with FESTIVE", Junchen Jiang and al., CoNext 2012;

the bit rate selection. The basic strategy is to conservatively choose the highest available bit rate lower than the estimated bandwidth. The conservatism of the selection algorithm will be evaluated according to the margin taken between the value of the estimated bandwidth and the value of the maximum requested bit rate allowed. The conservative value may be expressed in percentage;

the bandwidth estimation. The bandwidth estimation is based on the instantaneous throughput (i.e. the download size divided by the download time). Most commercial players improve the estimation using filtering techniques. The current estimation is then averaged over the last several observations to smooth its dynamic.

While these HAS techniques have proven to work reasonably well when compared to pre-existing technologies, recent works point out that under some specific challenging circumstances (i.e. competition with another HAS client or with another TCP flow on a bottleneck), HAS implementations can suffer from severe stability, fairness and efficiency issues.

In particular, it has been observed that two HAS clients competing for bandwidth leads to unpredictable results, ultimately jeopardizing the user experience. In addition, HAS terminals show an incapacity to reclaim their fair share of bandwidth when competing with a greedy TCP flow (e.g. bulk transfer) because of their periodic download profile resulting in OFF periods where the bandwidth is not evaluated and then potentially underestimated. And during these OFF periods in particular, the other TCP flow can take the opportunity to grab the bandwidth.

Lastly, during the steady state, HAS client terminals apply a given bandwidth conservatism to maintain a given target rate (e.g. a conservative value of 20%), so that HTTP streaming fails to fill 100% of the provided bandwidth leading to bandwidth underutilization.

Besides, it has been observed by the Applicant that convergence is also an important criterion to evaluate the efficiency and depends on the initial conditions. The time to converge is currently not deterministic and might be long, which results in a poor user experience and potentially a sub optimal bandwidth usage.

The present invention attempts to remedy at least some of the above mentioned concerns in order to, at least, improve the convergence of a streaming content to a defined target rate.

SUMMARY OF THE INVENTION

The invention concerns a method for reserving bandwidth for an adaptive streaming client belonging to at least one network and configured for receiving a streaming content from at least one server, the streaming content being available at more than one data rate at the server,
which is remarkable in that it comprises
reserving for the client, when at least one event occurs, a transient bandwidth depending on a predetermined target data rate associated with the streaming content requested by the client and a transient margin.

Thanks to the present invention, the initial conditions of the adapting streaming client can be modified and/or influenced in order to improve its convergence to a target data rate, by temporarily opening widely the bandwidth allocated to a requested streaming content at start-up. In order to reduce the time to converge and to enforce stability, the present invention proposes at least to allocate a transient bandwidth during the client transient state. The Applicant has observed that the more the bandwidth will be reserved for a HAS streaming content (e.g. up to a given limit), the faster the convergence will be. In addition, when the convergence of an adaptive streaming client is faster, the stability and fairness are enforced for the whole duration of the adapting streaming session.

According to a preferred embodiment, said transient margin depends on at least one of the following parameters:
the total available bandwidth of said network;
the determined target data rate associated with said streaming content;
the competing streams sharing the network bandwidth;
the priority of said streaming content;
the conservative value of said adaptive streaming client.

In particular, when said adaptive streaming client uses a conservative value, the transient margin is advantageously greater than said conservative value.

In addition, the transient bandwidth can be preferably greater than the target data rate plus the conservative value and, when at least one other data rate—higher than the target data rate—is available at the server, the transient bandwidth is preferably lower than said higher data rate plus the conservative value of the adaptive streaming client, in order to prevent the client to switch up to the higher data rate.

In another aspect of the present invention, when the target data rate is the highest data rate offered by the server, the transient margin can be lower than or equal to the difference between the total available bandwidth of the network and the target data rate.

In a further aspect of the present invention, said transient bandwidth can be reserved for the adaptive streaming client during a transient period which depends on the filling speed or filling rate (also called filling state) of a buffer of said client.

More particularly, said client receiving the streaming content in the form of successive chunks of data, the transient period can end once the client buffer is filled, namely for instance:
when the number of chunks loaded in said client buffer exceeds the buffer length plus the number of chunks assumed to be played by the adaptive streaming client; or
when the chunk request frequency equals to the duration of a chunk.

Furthermore, said event belongs to the following group of events:
the start of reception of the streaming content by the adaptive streaming client;
a change (preferably noticeable) of network conditions;
the stop of reception of another stream.

Besides, the present invention also concerns a device for reserving bandwidth for an adaptive streaming client belonging to at least one network and configured for receiving a streaming content from at least one server, the streaming content being available at more than one data rate at the server. According to the invention, said device comprises:
a stream identifier configured for detecting at least one streaming content requested by said client;
a bandwidth manager configured for:
determining a target data rate associated with the streaming content requested by the client;
temporarily reserving for the client, when at least one event occurs, a transient bandwidth depending on the determined target data rate and a transient margin.

In addition, said device is configured for detecting said event belonging to the following group of events:
the start of reception of the streaming content by the adaptive streaming client;
a change of network conditions;
the stop of reception of another stream.

Moreover, said adaptive streaming client using a conservative value, the transient margin is preferably greater than the conservative value.

When at least one other available data rate—higher than the target data rate—is available at the server, the transient bandwidth is preferably lower than said higher data rate plus the conservative value of the adaptive streaming client, in order to prevent the client from switching up to the higher data rate.

Said device can, for instance, be a gateway or a router.

The present invention further concerns a computer program product downloadable from a communication network and/or recorded on a medium readable by computer and/or executable by a processor, comprising program code instructions for implementing the above-mentioned method.

In addition, the present invention also concerns a non-transitory computer-readable medium comprising a computer program product recorded thereon and capable of being run by a processor, including program code instructions for implementing the method previously described.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 2 and 3, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein.

According to a preferred embodiment, the present invention is depicted with regard to the HTTP adaptive streaming (so called HAS) protocol. Naturally, the invention is not restricted to such a particular environment and other adaptive streaming protocol could of course be considered and implemented.

Figure 1:
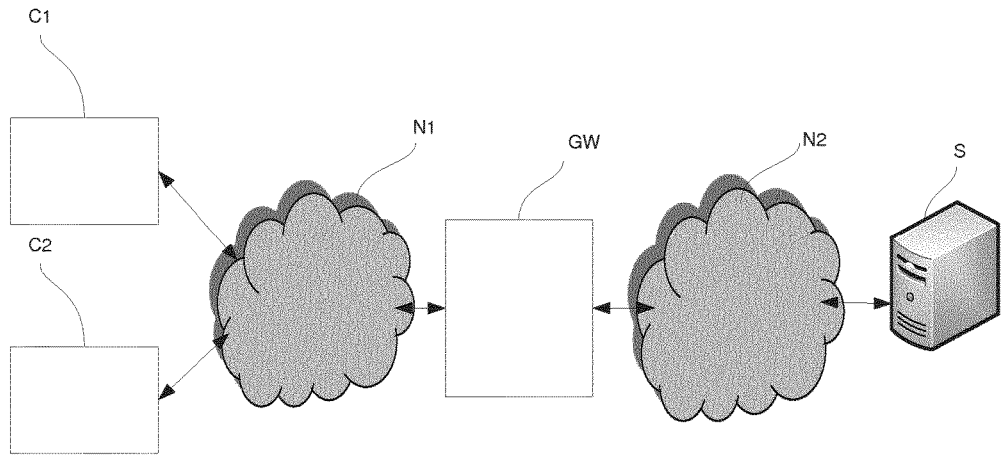
FIG. 1 is a schematic diagram of a Client-Server network architecture wherein the present invention might be implemented.

As depicted in FIG. 1, the Client-Server network architecture—wherein the present invention might be implemented—comprises for example two client terminals C1 and C2, a gateway GW and one or more HTTP servers S (only one is represented on FIG. 1). Obviously, additional client terminals may be present in said architecture.

The client terminal C1—which is an HTTP adaptive streaming (HAS) client terminal connected to the gateway GW through a local network N1 (as a home network or an enterprise network)—wants to connect to a HTTP server S through a broadband network N2 (as the Internet network). The HAS client terminal C1 presents a given conservative value. The local network N1 is connected to the broadband network N2 thanks to the gateway GW.

The conservative value can be the minimum margin taken by the client terminal between the value of the estimated bandwidth and the value of the selected requested bit rate. The conservative value may be expressed in percentage of the estimated bandwidth.

The HTTP server S streams chunks to the client terminal C1, upon the client request, using HAS protocol over one or more TCP/IP connections.

Figure 2:
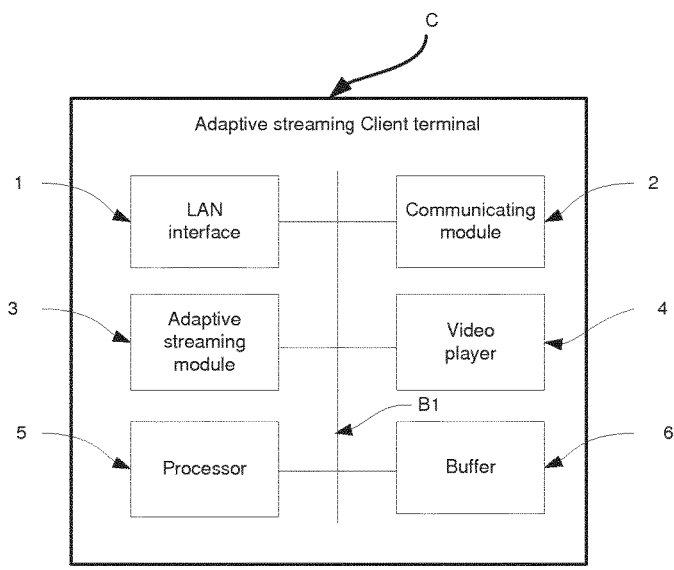
FIG. 2 is a block diagram of an example of a client terminal of the network architecture of FIG. 1.

According to the preferred embodiment as described in FIG. 2, the HAS client terminal C1 comprises at least:
- a LAN (Local Area Network) interface of connection 1 (wired and/or wireless, as for example Wi-Fi, Ethernet, etc.) to the local network N1;
- a communication module 2 containing the protocol stacks to communicate to the HTTP server S. In particular the communication module 2 comprises the TCP/IP stack well known in the art. Of course, it could be any other type of network and/or communicating means enabling the client terminal C1 to communicate to the HTTP server S;
- an adaptive streaming module 3 which receives the HTTP streaming multimedia content from the HTTP server S. It continually selects the chunk at the bit rate that better matches the network constraints and its own constraints;
- a video player 4 adapted to decode and render the multimedia content;
- one or more processor(s) 5 for executing the applications and programs stored in a non-volatile memory of the client terminal C1;
- a buffer 6 configured for buffering the chunks received from the HTTP server S before their transmission to the video player 4;
- an internal bus B1 to connect the various modules and all means well known to the skilled in the art for performing the generic client terminal functionalities.

In the preferred embodiment, the client terminal C1 is a portable media device, a mobile phone, a tablet or a laptop. Naturally, the client terminal C1 might not comprise a complete video player, but only some sub-elements such as the ones for demultiplexing and decoding the media content and might rely upon an external means to display the decoded content to the end user. In this case, the client terminal C1 is a HTTP Adaptive Streaming capable video decoder, such as a set-top box.

Besides, the gateway GW of the preferred embodiment is a Digital Subscriber Line (DSL) gateway, providing an Internet broadband access to the local network N1 through the DSL technology. Of course, the gateway could be any type of broadband gateway such as cable, fiber or wireless.

Figure 3:
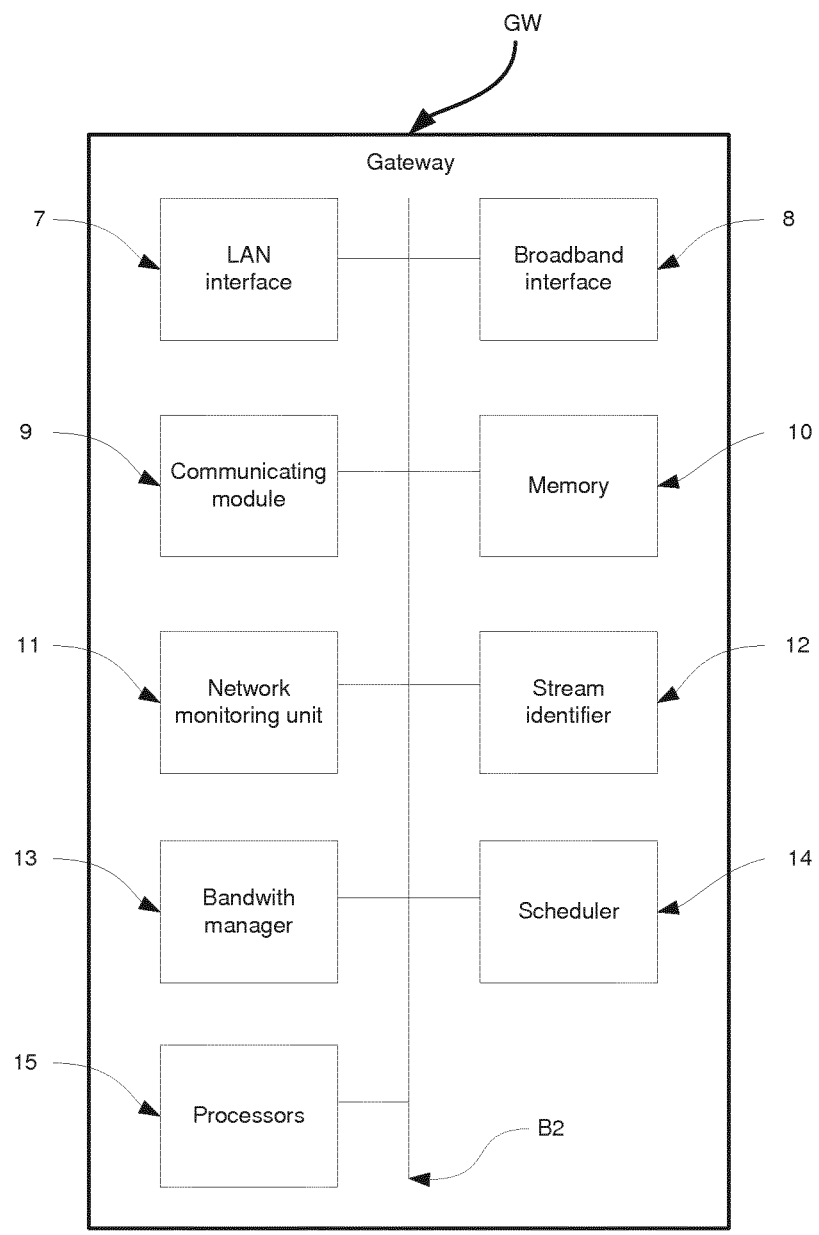
FIG. 3 is a block diagram of an example of a gateway according to the preferred embodiment of the present invention.

As shown in FIG. 3, the gateway GW comprises:
- a LAN interface of connection 7 (wired and/or wireless, as for example Wi-Fi, Ethernet, etc.) to the local network N1;
- a broadband interface of connection 8 (wired and/or wireless) to the broadband network N2; and
- a communicating module 9 comprising the protocol stacks to communicate through the interfaces of connection 7 and 8. In particular, the communicating module comprises an Internet Protocol stack, noted IP stack;
- a memory 10, notably adapted to store information extracted from the manifest (playlist or XML files for instance);
- one or more processor(s) 15 for executing the applications and programs stored in a non-volatile memory of the gateway GW;
- an internal bus B2 to connect the various modules and processing means, routing and bridging means and all means well known to the skilled in the art for performing the generic residential gateway functionalities.

As previously described, to play a multimedia content (e.g. a movie) in adaptive streaming, the client terminal C1 first needs to obtain, form a server S, a manifest listing the available representations (in terms of bitrate and resolution), of the requested multimedia content. This manifest has been generated in advance and stored on the HTTP servers S.

Moreover, the gateway GW further comprises a network monitoring unit 11 for identify changes in network conditions and a stream identifier 12 adapted to analyze the streams received at the gateway. Each time the client terminal C1 issues a service request, the stream identifier 12 identifies said request and collects service information by intercepting the manifest returned from the server S to said client C1, in order to analyze and extract information such as the available bit rates announced by the server S and the associated chunks URLs. To intercept the manifest, the stream identifier 12 is aware of the available streaming techniques and on the associated protocols. For each protocol, it knows the type of packet that transports the manifest. For instance, the stream identifier 12 is aware of the Apple HTTP Live Streaming, the Microsoft Smooth Streaming and the Adobe Open Source Media Framework techniques. Of course, it can be configured to be made aware of other streaming techniques.

The stream identifier 12 also identifies when a stream is no longer received at the gateway GW. As an illustrative but non-limitative example, when a stream is not received during a predefined period of time, the stream identifier 12 can consider that the session is finished and can warn a bandwidth manager 13 of the gateway GW which can modify traffic control rules and bandwidth reservation accordingly as described hereinafter.

Said bandwidth manager 13 is then adapted to receive information obtained by the stream identifier 12. In particular, the bandwidth manager 13 decides if a service is admitted and determines for the service a target bitrate, possibly changing at the same time the targets for other services that may be already running. The bandwidth manager 13 measures the value of the maximum bandwidth available on the broadband interface 8 of the gateway GW.

In particular, when the HAS client terminal C1 requests a streaming content to server S, the bandwidth manager 13—after determining a target bitrate $R_T$ based on information received from the stream identifier 13 and additional parameters (such as available network bandwidth, priority of the stream, conservative value of the client terminal, etc.)—determines and temporarily reserves a transient bandwidth $BW_t$ associated with the requested streaming content and then configures a scheduler 14 of the gateway GW.

The scheduler 14 is adapted to manage the transmission of packets in the local network N1. In particular, each HAS stream is assigned an independent queue that is allocated exactly one transient bandwidth $BW_t$ during a transient period $D_c$ and one steady bandwidth $BW_s$ until the end of the stream reception.

The transient bandwidth $BW_t$ is reserved for a transient period $D_c$ and depends on the determined target data rate $R_T$ and a transient margin $m_t$. More especially, the transient bandwidth $BW_t$ can be equal to the target bitrate $R_T$ plus the transient margin $m_t$, such as:

$$BW_t = R_T + m_t \text{ for } t \in [T_o; T_o + D_c]$$

wherein t is the time and $T_o$ the beginning of the reception of the streaming content.

Advantageously, the transient margin $m_t$ is greater than the conservative value $V_c$ ($m_t > V_c$), so that:

$$BW_t > R_T + V_c \text{ for } t \in [T_o; T_o + D_c]$$

When at least one other birate (noted $R_{T+1}$), higher than the target bitrate $R_T$, is listed in the received manifest and available at the server S, then the transient bandwidth $BW_t$ is lower than said higher data rate $R_{T+1}$ plus the conservative value $V_c$ of the HAS client terminal C1, so that:

$$BW_t < R_{T+1} + V_c$$

As another illustrative example, the transient bandwidth $BW_t$ may be obtained by the following relationship:

$$BW_t = R_T \times \frac{100}{100 - m_t} \text{ for } t \in [T_o; T_o + D_c]$$

Naturally, other formulae may be used to determine the transient bandwidth.

The transient margin $m_t$ can be based on one or more of the following parameters:
- the total available bandwidth $BW_{TOTAL}$ at the broadband network N2;
- the determined target data rate $R_T$ associated with said streaming content requested by the HAS client terminal C1;
- the competing streams sharing the network bandwidth (for instance a stream received by the second client terminal C2);
- the priority of said streaming content;
- the conservative value of said adaptive streaming client terminal C1.

In particular, when the target bitrate $R_T$ is the highest bitrate offered by the server (listed in the manifest), then the transient margin $m_t$ is at most equal to the difference between total available bandwidth $BW_{TOTAL}$ and the target bitrate $R_T$, so that:

$$m_t \leq BW_{TOTAL} - R_T$$

In the preferred embodiment, the bandwidth manager 13 determines the bandwidth reservation, based on the value of the maximum bandwidth available at the broadband interface 8. Alternatively, instead of the maximum bandwidth available at the broadband interface 8 of the broadband network N2, the bandwidth manager 13 could take into account the maximum bandwidth available at the LAN interface of the local network N1. It would then determine the bandwidth reservation, based on the value of the maximum bandwidth available on the local network N1. This occurs if the bottleneck is at the local network N1 instead of the broadband network N2.

While it has been described a reservation of a transient bandwidth $BW_t$ during a transient period $D_c$ by the bandwidth manager 13 when the HAS client terminal C1 starts to receive its requested streaming content from the server S, such a transient bandwidth reservation can also be performed when the bandwidth sharing has to be modified with a large change of network conditions (notably an increase of the bandwidth part for the HAS client C1) or the stop of reception of another stream resulting in an increase of the bandwidth part allocated to the HAS client terminal C1. Such events—identified by a corresponding message (e.g. sent by the gateway GW)—trigger the temporary grant of an extra part of bandwidth to the HAS client terminal C1, in order to speed up its convergence to a steady state. In other words, such an event is detected upon receipt of the associated message by the client terminal C1.

Furthermore, the transient period $D_c$ can be set in advance by the bandwidth manager 13 and be equal, for instance, to a fixed value (e.g. few seconds). By contrast, said transient period $D_c$ might also not be set in advance and might depend on the filling speed of the buffer 6 of the HAS client terminal C1. In particular, the transient period $D_c$ can rely on the number of loaded chunks in the buffer 6 of the client terminal C1 and can end, for instance, when the number of chunks received by the HAS client terminal C1 exceeds the buffer length plus the number of chunks assumed to be played by the adaptive streaming client during the elapsed time.

It is noted that the buffer filling period $T_b$ can be approximated by the following relationship:

$$T_b = \frac{L_B \times R_T}{BW_t - R_T}$$

wherein:
$L_B$ is the buffer length (in seconds);
$R_T$ is the target bitrate (in kbps);
$BW_t$ is the reserved transient bandwidth (in kbps).

In a variant, the transient period $D_c$ can be maintained until the chunk request frequency is equal—at least roughly—to the duration of a chunk (the buffer 6 is then considered filled).

In another variant or as a complement, the transient period may also depend on the filling rate (or state) of the buffer 6 of the client terminal C1 (e.g. 80% of the buffer).

Besides, in a further aspect of the present invention, the bandwidth manager 13 can also reserve one steady bandwidth $BW_s$—associated with the streaming content requested by terminal C1—after the end of the transient period $D_c$, during the steady state.

The steady bandwidth $BW_s$ is equal to the determined target data rate $R_T$ and a steady margin $m_s$, said steady margin $m_s$ being lower than the transient margin $m_t$ ($m_s<m_t$), such as:

$$BW_s = R_T + m_s \text{ for } t > T_o + D_c \text{ and } BW_s < BW_t$$

In particular, the steady bandwidth $BW_s$ might be at least equal to the target bitrate $R_T$ plus the conservative value $V_c$ (the steady margin $m_s$ is then equal to the conservative value $V_c$), so that:

$$BW_s \geq R_T + V_c \text{ for } t > T_o + D_c$$

As another example, the steady bandwidth $BW_s$ might be obtained by the following relationship:

$$BW_s = R_T \times \frac{100}{100 - m_s} \text{ for } t > T_o + D_c$$

The decisions of the bandwidth manager 13 regarding bandwidth reservation (transient bandwidth $BW_t$, steady bandwidth $BW_s$) for an HAS streaming content depend on many parameters and user or service provider preferences. They lead to a set of arbitration schemes enforced by the bandwidth manager and fed by characteristics of the requested content, the network, the client terminals of the network, etc.

In case of competing streams (e.g. requested by client terminal C1 and C2), the bandwidth reservation by the bandwidth manager 13 can rely on the client terminal type. For example, a stream for a television set can have a priority higher than a stream for a portable media player. Alternatively, bandwidth reservation can also be based on the location of the client terminal C1, C2 in the local network N1, on user's identity, etc. A client terminal C1, C2 located in a living room may have a higher priority than a client terminal C1, C2 located in a bedroom. Preferably, the gateway GW comprises a user interface (not shown on the Figures) that enables adjusting priorities between the streams. Entries in the user interface may be, for example, the device type, its location and its priority.

According to the present invention, the bandwidth manager 13 then defines two separate rules for the HAS streaming content requested by the client terminal C1. The first rule is applied for a quite short duration (aka the transient period $D_c$)—which corresponds to the convergence period—and the second rule is then applied until the end of the stream reception. The convergence period corresponds to the period during which the HAS client terminal C1 is in a transient state, trying to reach the target rate $R_T$ and fill its buffer. After this convergence period, the HAS client terminal C1 should be in steady state, keeping the same rate until the end of the stream or until the network conditions change. The first rule temporarily grants an extra part of the bandwidth to the HAS client terminal C1 in order to speed up its convergence to the steady state and to enforce stability. The Applicant has observed that the more the bandwidth is reserved, the faster the convergence to the target bitrate will be.

The proposed invention can be applied when the stream competing with a given HAS stream is a bulky TCP download, a progressive download stream or another HAS stream.

It should be understood that the transient and steady margins are determined with experiments based on the above mentioned parameters (priority, user preference, competing streams, etc.).

As an illustrative, but non limitative, example, for a Smooth Streaming HAS service with a 30 seconds buffer, the following typical values can be chosen:
transient margin=40% of the allocated transient bandwidth to be determined $$\left( \text{e. g. } m_t = 40 \text{ in the formulae } BW_t = R_T \times \frac{100}{100 - m_t} \text{ for } t \in [T_o; T_o + D_c] \right);$$

steady margin=20% of the allocated steady bandwidth to be determined $$\left( \text{e. g. } m_s = 20 \text{ in the formulae } BW_s = R_T \times \frac{100}{100 - m_s} \text{ for } t > T_o + D_c \right).$$

Figure 4:
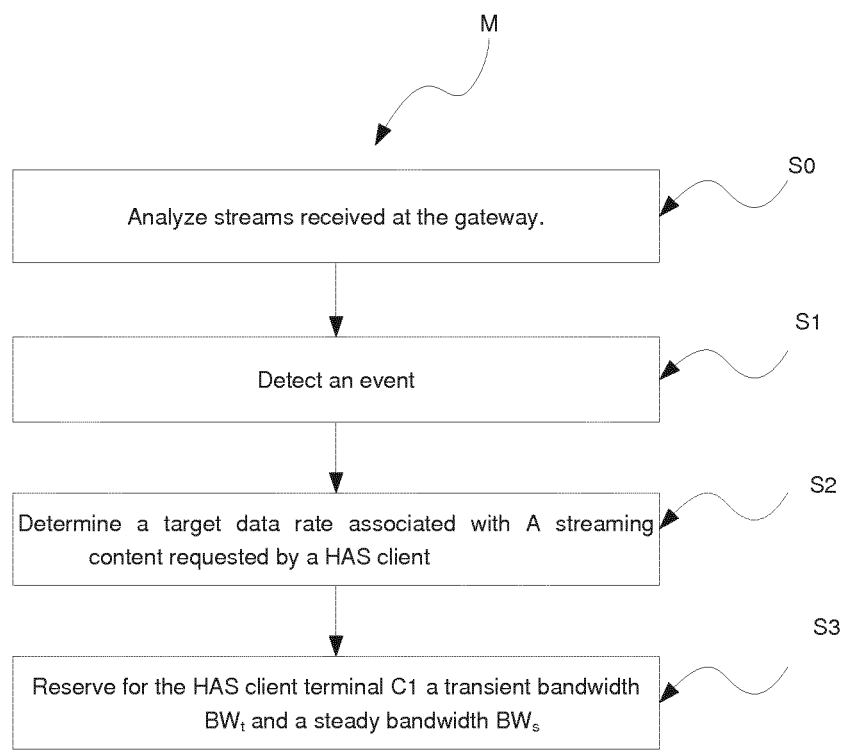
FIG. 4 is a flowchart depicting the steps of the bandwidth reservation method implementing by the gateway of FIG. 3, according to the preferred embodiment.

According to the preferred embodiment, as shown on FIG. 4, the gateway GW is configured for implementing the method for reserving bandwidth for the HAS client terminal C1, which comprises the following steps:
analyzing (step S0) the streams received at the gateway GW;
detecting (step S1) a given event (e.g. start of reception of an HAS streaming content by the client terminal C1, large change of network conditions);
determining (step S2) a target data rate associated with the streaming content requested by the HAS client terminal C1;
reserving (step S3) for the HAS client terminal C1, when at least one event is detected, a transient bandwidth $BW_t$—for a transient period $D_c$—and a steady bandwidth $BW_s$ until the end of the HAS streaming content.

In the preferred embodiment, bandwidth reservation is performed at the gateway GW. Alternatively, it could be also performed in a router located in the local network N1 and connected to the gateway GW or in an external router or in cache located in the broadband network N2.

The flowchart and/or block diagrams in the Figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for reserving bandwidth for an adaptive streaming client configured for belonging to at least one network and configured for receiving a streaming content from at least one server, the streaming content being available at a plurality of data rates at the server, said method comprising:
reserving for the adaptive streaming client, when at least one event occurs, a transient bandwidth depending on a predetermined target data rate associated with the streaming content requested by the adaptive streaming client and a transient margin; and
wherein said transient bandwidth is reserved for the adaptive streaming client during a transient period which depends on a filling speed of a buffer of said adaptive streaming client receiving the streaming content in a form of successive chunks of data, the transient period ending when a duration between two chunk requests equals to the duration of a chunk.

2. The method according to claim 1, wherein said transient margin depends on at least one of the following parameters:
a total available bandwidth of said network,
a determined target data rate associated with said streaming content,
a competing streams sharing the network bandwidth,
a priority of said streaming content, and
a conservative value of said adaptive streaming client.

3. The method according to claim 1, wherein, said adaptive streaming client using a conservative value, the transient margin is greater than said conservative value.

4. The method according to claim 3, wherein the transient bandwidth is greater than the predetermined target data rate plus the conservative value and, when at least one other data rate—higher than the predetermined target data rate—is available at the server, the transient bandwidth is lower than said other data rate plus the conservative value of the adaptive streaming client.

5. The method according to claim 1, wherein, when the target data rate is the highest data rate offered by the server, the transient margin is lower than or equal to a difference between a total available bandwidth of the network and the target data rate.

6. The method according to claim 1, wherein said transient bandwidth is reserved for the adaptive streaming client during a transient period which depends on a filling rate of a buffer of said adaptive streaming client.

7. The method according to claim 1, wherein, said adaptive streaming client receiving the streaming content in a form of successive chunks of data, the transient period ends when a number of chunks loaded by the adaptive streaming client in said client buffer exceeds a buffer length plus the number of chunks assumed to be played by the adaptive streaming client during an elapsed time.

8. The method according to claim 1, wherein said event belongs to a following group of events:
a start of reception of the streaming content by the adaptive streaming client;
a change of network conditions; and
a stop of reception of another stream.

9. A device for reserving bandwidth for an adaptive streaming client configured for belonging to at least one network and configured for receiving a streaming content from at least one server, the streaming content being available at a plurality of data rates at the server, said device comprises one or more processors configured for:
detecting at least one streaming content requested by said adaptive streaming client; reserving for the adaptive streaming client, when at least one event occurs, a transient bandwidth depending on a predetermined target data rate associated with the requested streaming content and a transient margin; and wherein said transient bandwidth is reserved for the adaptive streaming client during a transient period which depends on a filling speed of a buffer of said adaptive streaming client receiving the streaming content in a form of successive chunks of data, the transient period ending when a duration between two chunk requests equals to the duration of a chunk.

10. The device according to claim 9, configured for detecting said event belonging to following group of events:
a start of reception of the streaming content by the adaptive streaming client;
a change of network conditions; and
a stop of reception of another stream.

11. The device according to claim 9, wherein, said adaptive streaming client using a conservative value, the transient margin is greater than the conservative value.

12. A computer program product downloadable from a communication network and recorded on a non-transitory computer storage medium readable by a computer, and executable by a processor, comprising program code instructions for implementing the method according to claim 1.

13. A non-transitory computer-readable medium comprising a computer program product recorded thereon and capable of being run by a processor, including program code instructions for implementing the method according to claim 1.

* * * * *